United States Patent Office 3,413,358
Patented Nov. 26, 1968

3,413,358
PROCESS FOR PREPARING HIGHER
ALIPHATIC ALCOHOLS
Teruzo Asahara, Tokyo, Japan, assignor to Mitsubishi Petrochemical Co., Ltd., Tokyo, Japan
No Drawing. Filed Mar. 15, 1966, Ser. No. 534,321
Claims priority, application Japan, Mar. 26, 1965, 17,235/65
6 Claims. (Cl. 260—642)

ABSTRACT OF THE DISCLOSURE

Selective preparation of aliphatic alcohols having 10–20 carbon atoms by telomerization of ethylene and a lower alkanol in the presence of a lower alkyl bromide or iodide and at least one metal selected from the group consisting of magnesium, zinc, tin, lead, copper, chromium, molybdenum, manganese, iron, cobalt and nickel.

---

This invention relates to a process for preparing higher aliphatic alcohols having carbon atoms of from about 10 to 20 selectively and in high yields by the telomerization reaction of ethylene with lower aliphatic alcohols.

It is well known to those skilled in the art that higher aliphatic alcohols may be obtained by the telomerization of ethylene with lower aliphatic alcohols in the presence of a reaction initiator such as peroxides, for example, di-tert-butylperoxide, or, azo compound, for example, azobisisobutyronitrile.

For instance, it is known that higher aliphatic alcohols may be obtained by reacting ethylene with methanol as illustrated in the following equation:

$$CH_3OH + nC_2H_4 \rightarrow H \cdot (C_2H_4)_n \cdot CH_2OH$$

In the above reaction, ethylene and methanol are called "taxogen" and "telogen," respectively, and the resultant higher aliphatic alcohols are called "telomer."

However, these prior arts have disadvantages in that relatively lower aliphatic alcohols having carbon atoms of below 20 can not be produced selectively and efficiently. In other words, in the prior processes, the conversion rate of methanol at the reaction temperature of 140° C. is only approximately 10% and the yields of the resulting alcohols having less than 17 carbon atoms are extremely low. Although the conversion rate of methanol may be increased to 40–60% by lowering the reaction temperature to 60°–70° C., the polymerization degree of telomer $n$ is undesirably increased. As a result, most of the resultant alcohols are of the polymerization degree $n$ of from 15 to 20 i.e. the ones having carbon atoms of from 31 to 41. On the other hand, when the reaction temperature is raised to 200°–230° C., the polymerization degree $n$ is decreased, and the great majority of the alcohols thus obtained will have carbon atoms of from 7 to 9. However, in this case, the conversion rate of methanol is about 1.5% which is extremely low. Furthermore, the polymerization degree $n$ may be decreased somewhat by increasing the concentration of di-tert-butylperoxide. However, in this case, the resultant alcohols tend to be subjected to the oxidation which results in the formation of undesirable branched alcohols.

I have discovered the fact that higher aliphatic alcohols having carbon atoms of about 10–20, which are of great utility for industrial use, may be produced selectively and efficiently by effecting the telomerization reaction of ethylene with lower aliphatic alcohols in the presence of alkyl halides.

Further, I have also discovered that if metals such as magnesium, zinc, tin, lead, copper, chromium, molybdenum, iron, cobalt, nickel and the like exist together with the above-mentioned alkyl halides in the reaction system, the reaction rate is increased and the molecular weight distribution of the obtained higher alcohols is narrowed.

Moreover, I have found out that by adding a radical reaction initiator such as di-tert-butylperoxide to the reaction system, the reaction may be accelerated and the molecular weight distribution is made narrower.

The process of this invention has its basis on my discoveries mentioned above.

According to this invention, there is provided a novel process for preparing higher aliphatic alcohols having carbon atoms of from about 10 to 20 selectively and in high yields by effecting the telomerization reaction of ethylene with lower aliphatic alcohols in the presence of alkyl halides, or, alkyl halides and the above-mentioned metals, and further, if required, a radical reaction initiator.

The lower aliphatic alcohols which may be used in the process of this invention include methanol, ethanol, isopropanol, isobutanol and the like.

The alkyl groups of the above-mentioned alkyl halides which may be used in the process of this invention are preferably the lower alkyl groups such as methyl, ethyl, propyl, butyl and the like. The alkyl groups of the alkyl halides and those of the lower aliphatic alcohols may be the same or different, however, the use of the same alkyl group is preferable.

Amongst the alkyl halides, alkyl iodide is most preferably used in the process of this invention and particularly methyl iodide is most practicable from the standpoints of availability and cost. Although the effect is somewhat less than that of alkyl iodide, alkyl bromide is also capable of decreasing the polymerization degree $n$.

As the metals, magnesium, zinc, tin, lead, copper, chromium, molybdenum, manganese, iron, cobalt, nickel and the like may be used in the process of this invention as described above and particularly, manganese, zinc, tin and lead are preferable.

It is considered that in the telomerization reaction of, for instance, ethylene with methanol in the presence of alkyl halides, or, alkyl halides and the metals, the alkyl halides or the metal together therewith, serves as a reaction initiator and, as a result, the formation of methyl radical is facilitated and the polymerization degree $n$ is decreased thereby enabling the production of higher aliphatic alcohols having carbon atoms of from about 10 to 20 selectively in high yields.

In the process of this invention, peroxides and azo compounds known heretofore may also be used together with the reaction initiator of this invention.

The amount of alkyl halides used as a reaction initiator in the process of this invention is preferably from 0.001 to 0.1 mol per mol of lower aliphatic alcohol as a telogen.

The amount of metals used in the process of this invention is generally from 0.01 to 0.1 mol per mol of the alcohol, however, an amount even less than mentioned above may also be effective.

The reaction in the process of this invention is, in general, carried out under a pressure of ethylene of from 20 kg./cm.² to 50 kg./cm.² at a temperature of from 80° C. to 110° C.

The reaction initiator which is used in the process of this invention has advantage in that the handling is much easier and safer than those peroxides known heretofore.

The process of this invention may further be explained in the following examples more practically. However, it should not be construed that these examples restrict this invention in any way as they are given merely by way of illustration:

Example 1

2.4 mols of methanol, 0.05 mol of methyl iodide and 0.025 mol of metallic magnesium were charged to an autoclave of 200 cc. capacity, and ethylene gas was introduced thereto under 20 atmospheric pressures. After the reaction was carried out at a temperature of 120° C. for 3 hours, the resultant mixture was filtered and distilled. Higher aliphatic alcohol was obtained at the conversion rate of 20% based on the amount of methanol charged. The higher aliphatic alcohol thus obtained was of the following composition:

| Number of carbon atoms of alcohol: | Percentage |
|---|---|
| 7 | 5 |
| 9 | 10 |
| 11 | 45 |
| 13 | 20 |
| 15 | 15 |
| 17 up | 5 |

Example 2

2.4 mols of methanol, 0.01 mol of methyl iodide and 0.005 mol of metallic tin were charged to an autoclave of 200 cc. capacity and ethylene gas was introduced thereto under 40 atmospheric pressures. After the reaction was carried out at a temperature of 90° C. for 3 hours, the pressure drop of ethylene was 20 atmospheric pressures. The resultant mixture was filtered and distilled to give higher aliphatic alcohol at the conversion rate of 13% based on the amount of methanol charged. The higher aliphatic alcohol thus obtained was of the following composition:

| Number of carbon atoms of alcohol: | Percentage |
|---|---|
| 7 | 2 |
| 9 | 3 |
| 11 | 15 |
| 13 | 28 |
| 15 | 30 |
| 17 up | 20 |

Example 3

2.4 mols of methanol, 0.05 mol of methyl bromide and 0.03 mol of metallic cobalt were charged to an autoclave of 200 cc. capacity and ethylene gas was introduced thereto under 30 atmospheric pressures. The reaction was carried out at a temperature of 120° C. for 3 hours and the pressure drop of ethylene was 10 atmospheric pressures. The resultant mixture was then filtered and distilled to give higher aliphatic alcohol at the conversion rate of 7% based on the amount of methanol charged. The higher aliphatic alcohol was of the following composition:

| Number of carbon atoms of alcohol: | Percentage |
|---|---|
| 9 | 1 |
| 11 | 3 |
| 13 | 15 |
| 15 | 15 |
| 17 | 16 |
| 19 | 25 |
| 21 up | 25 |

What I claim is:

1. A process for selectively preparing aliphatic alcohols having about 10–20 carbon atoms by telomerization of ethylene and a lower alkanol, comprising heating a reaction mixture consisting essentially of (a) ethylene, (b) lower alkanol, (c) a compound selected from the group consisting of a lower alkyl bromide and a lower alkyl iodide in an amount of from 0.001 to 0.1 mol per mol of said alkanol and (d) at least one metal selected from the group consisting of magnesium, zinc, tin, lead, copper, chromium, molybdenum, manganese, iron, cobalt and nickel at a temperature of about 80 to about 120° C. and a pressure of about 20 to about 50 kg./cm.$^2$.

2. A process according to claim 1 wherein said lower alkanol is selected from the group consisting of methanol, ethanol, isopropanol and isobutanol.

3. A method according to claim 1 wherein (c) is methyl iodide or methyl bromide.

4. A method according to claim 1 wherein the reaction mixture contains a radical reaction initiator consisting of di-tert-butylperoxide.

5. A method according to claim 1 wherein the reaction mixture contains a radical reaction initiator consisting of azobisisobutyronitrile.

6. A method according to claim 1 wherein the metal is present in an amount from about 0.01 to about 0.1 mol per mol of alkanol.

References Cited

UNITED STATES PATENTS

| | | |
|---|---|---|
| 2,402,137 | 6/1946 | Hanford et al. |
| 2,519,691 | 8/1950 | Nevworth _____ 260—658 |
| 2,852,565 | 9/1958 | Nozaki _____ 260—658 |
| 3,213,149 | 10/1965 | Takahashi et al. _____ 260—642 |
| 3,255,260 | 6/1966 | Anderson _____ 260—642 |
| 3,309,393 | 3/1967 | Nakagawa et al. __ 260—658 X |

OTHER REFERENCES

Kharasch et al.: J. Am. Chem. Soc., vol. 69 (1947), pp. 1100 to 1110, QD1A5.

LEON ZITVER, *Primary Examiner.*

J. E. EVANS, *Assistant Examiner.*